UNITED STATES PATENT OFFICE.

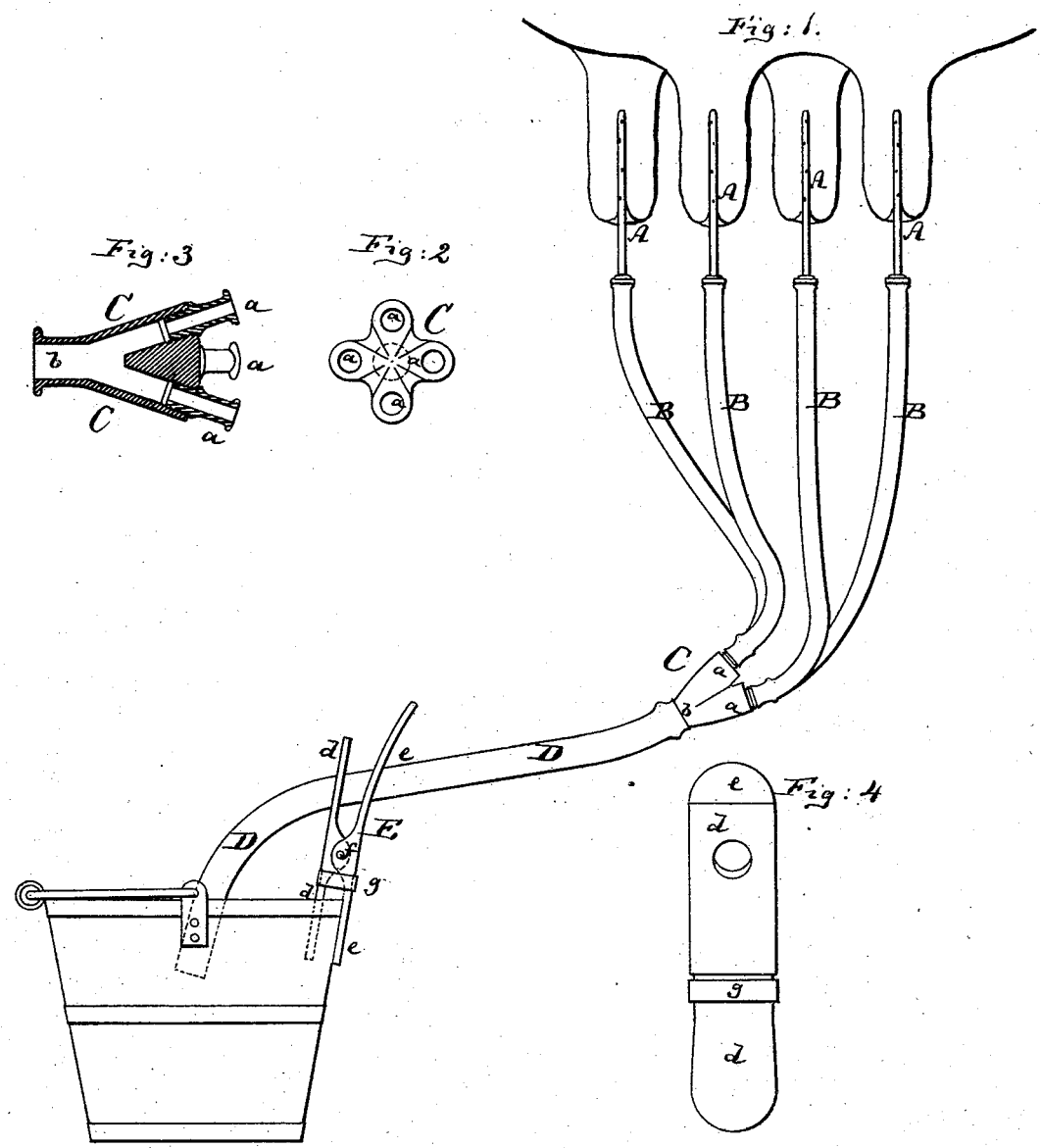

FRIEDRICH W. KORDENAT, OF NEWARK, NEW JERSEY.

IMPROVEMENT IN COW-MILKERS.

Specification forming part of Letters Patent No. 155,453, dated September 29, 1874; application filed July 11, 1874.

*To all whom it may concern:*

Be it known that I, FRIEDRICH WILLIAM KORDENAT, of Newark, in the county of Essex and State of New Jersey, have invented a new and Improved Cow-Milker, of which the following is a specification:

Figure 1 is a side view of my improved cow-milker; Fig. 2, a top view of the joint for connecting the flexible tubes; Fig. 3, a horizontal central section of the same, and Fig. 4 a detail side view of the clamp for connecting the discharge-tube with the receiving-vessel.

Similar letters of reference indicate corresponding parts in all the figures.

The principal object of this invention is to produce an apparatus for milking cows automatically, without the aid of pumps or other actuating mechanism.

My invention consists, first, in the use, on a cow-milker, of small perforated pipes, which are to be introduced within the teats to withdraw the milk from the udder or bag by virtue of atmospheric pressure.

It is well known that the teats of cows are securely closed by the muscles that surround their lower ends, and that it is only necessary to open them to allow the milk to flow out freely.

By the use of my invention, the mere introduction into the teats of the small round-ended perforated pipes will suffice to cause the milk to flow out of the udder in a continuous stream, the operation being rapid and without any pain whatever to the animal.

My invention also consists in further details of improvement, relating to the connection of the flexible milk-conduits that extend downward from said perforated pipes, and to the clamp for securing the discharge-pipe to a pail or other receiving-vessel.

In the accompanying drawing, the letters A A represent a series of small pipes of metal, or equivalent material, the diameter of each pipe being such that it may be readily introduced within the teat of a cow or other animal to be milked. The upper end of each pipe A is rounded to facilitate its painless introduction in the opening of a teat. Each pipe A is, moreover, provided with a series of small apertures along its upper part, which is to enter the teat. The lower end of each pipe A is open, and connected with a rubber or other flexible tube, B, by which the milk will be carried off from the pipe A. The lower ends of all the tubes B connect with the tubular upper branches *a a* of a hollow joint, C. A tubular downward extension, *b*, of the joint C connects with the discharge-pipe D, which is, by preference, also made of rubber.

The joint C is to be provided with at least as many upper branches *a a* as there are teats to be connected, being usually four; but I desire it to be understood that, although I call this invention a cow-milker, it is equally applicable to the milking of other animals, and so intended to be.

The discharge-pipe D passes through holes in the jaws *d e* of a spring-clamp, which is to connect with the edge of a pail or other receiving-vessel for the milk. The jaws *d e* are pivoted together, as shown at *f* in Fig. 1, and are connected with a spring, *g*, whereby their lower ends are crowded toward each other, so they will bind the rim of a pail or other vessel when placed to straddle the same.

For operation it is only necessary to place one or more pipes, A, into the teats of the animal, whereupon the milk will immediately begin to flow from the udder into the apertures of said pipes, and thence into the tubes B. The discharge-pipe D is, with its lower end, inserted within a pail or other vessel, it being held in place by the spring-clamp E, through the perforated jaws of which it is previously drawn, as shown.

I claim as my invention—

The spring-clamp E, having perforated jaws to receive the pipe D, in combination with the milker, to transfer the same from one vessel to another, substantially as and for the purpose hereinbefore described and set forth.

DR. FRIED. W. KORDENAT.

Witnesses:
   A. V. BRIESEN,
   E. C. WEBB.